United States Patent Office

Re. 28,128
Reissued Aug. 20, 1974

28,128

MOLTEN SALT HYDROCONVERSION PROCESS

Donald E. Hardesty and Thomas A. Rodgers, La Porte, Tex., assignors to Shell Oil Company, New York, N.Y.

No Drawing. Original No. 3,677,932, dated July 18, 1972, Ser. No. 123,827, Mar. 12, 1971, which is a continuation-in-part of abandoned application Ser. No. 764,917, Oct. 3, 1968. Application for reissue July 30, 1973, Ser. No. 383,870

Int. Cl. C10g *13/08, 23/02, 29/12*

U.S. Cl. 208—108 5 Claims

Matter enclosed in heavy brackets [ ] appears in the original patent but forms no part of this reissue specification; matter printed in italics indicates the additions made by reissue.

ABSTRACT OF THE DISCLOSURE

A new hydroconversion catalyst system comprising molten zinc halide in admixture with a modifying molten salt, such as an alkali metal halide, which markedly reduces the solubility of hydrocarbons in the salt melt, lowers salt viscosity and reduces tendency to foaming, all these changes in salt property being especially advantageous for practical applications in continuous hydrocarbon conversion processes.

CROSS REFERENCE

This is a continuation-in-part of Ser. No. 764,917, filed Oct. 3, 1968 (now abandoned).

BACKGROUND OF THE INVENTION

Field of the invention

This invention relates to a process for hydrofining and hydrocracking heavy hydrocarbon oils in the presence of a molten salt catalyst.

Description of the prior art

A steadily increasing demand for distillate petroleum products and a decreasing supply of crude oils of low residue content provides increasing incentive for processes which upgrade high boiling residual polynuclear hydrocarbon stocks. Large quantities of naphthenic, aromatic or mixed based crudes from which some distillate products are recoverable by traditional means are available. However, the residual fraction, in which is concentrated relatively large quantities of hetero-atomic materials containing sulfur, oxygen, and nitrogen and organometallic compounds, must be disposed of. In the past the low value stocks have been used for industrial and marine fuels, but the supply exceeds the demand. Moreover, air pollution restrictions on many industrial areas prevent the use of high sulfur and nitrogen fuels.

Current technology for upgrading these fuels such as thermal cracking, catalytic cracking and catalytic hydrogeneration are less than satisfactory. Cracking or hydrogenation is relatively costly when applied to residual stocks due to rapid catalyst deactivation by the contaminants and catalyst poisons found in residues.

It has recently been proposed that many of these disadvantages can be overcome by a hydrocracking process employing molten salt as a catalyst, such as zinc chloride and/or zinc chloride mixed with an acceptor such as zinc oxide.

The use of molten salt system such as zinc chloride or zinc chloride/zinc oxide acceptor catalyst systems does obviate many problems of the prior art. The catalyst in the form of a liquid offers a number of advantages. Continual renewal of fresh catalyst surface and the excellent heat transfer characteristics of a flowing molten salt allowing close temperature control in the reaction zone are examples. Catalyst contaminants, such as heavy metals and coke, can be continuously removed from the reaction zone with the salt allowing sustained operation.

However, the use of zinc halide with or without an oxide acceptor is not without problems. Molten zinc chloride is rather viscous, tends to foam and has high solubility for hydrocarbon compounds. All of these physical properties present problems in the operation of a practical process. The solubility of heavy hydrocarbons, those not removed from the process as a vapor, causes them to be difficult to separate from the salt. For example, one proposed process requires that the salt hydrocarbon mixture be cooled and dissolved with water to separate dissolved hydrocarbons. The salt must then be dehydrated and melted before reuse in the process. This feature alone is a serious economic detriment and represents one of the major drawbacks in proposed processes.

It has now been found that certain inorganic substances, for example, alkali metal halides, when added to zinc halides, change the physical properties of the melt without substantially reducing catalytic activity and thus allow a practical, feasible, continuous process. By addition of the modifiers to the zinc halide catalyst, the melt viscosity is lowered, foaming is controlled and the solubility of hydrocarbon in the melt is reduced to such a great extent that continuous phase separation is possible.

SUMMARY OF THE INVENTION

In broad aspect, the invention may be summarized as a hydroconversion process for upgrading heavy hydrocarbon oils characterized by contacting the oil at elevated temperature and pressure with a molten inorganic salt mixture comprising a major amount of zinc halide wherein the halide is selected from the group consisting of bromide chloride and iodide and a lesser amount of an alkali metal halide in the presence of hydrogen.

The process of the invention finds particular utility in processing heavy petroleum oils to obtain molecular weight reduction of the feed components (primarily the 900° F. plus boiling materials) reduction or removal of oxygen, nitrogen and sulfur compounds in the feed and reduction or removal of metal compounds.

The feed to the present process may be any high boiling hydrocarbon oil at least about 50% by volume of which boils above about 450° F. Though even lighter hydrocarbons can in principle be processed, the present process is most advantageous for treatment of oils containing materials which cannot be distilled in commercial equipment without extensive cracking, e.g., residual materials and hydrocarbon oils containing asphaltenes, resins and the like. The process finds its greatest utility in the treatment of stocks containing appreciable amounts of heteroatoms and/or metals. It is, therefore, particularly useful for the treatment of reduced crudes, pitches, vacuum residues, cracked gas oils, residues and the like which cannot otherwise be deeply flashed without excessive carryover of metal contaminants. In addition, certain crude petroleum oils which contain only small amounts of gasoline and kerosene boiling range hydrocarbons and which have been topped to remove lighter components may also be processed. Certain petroleum-like oils from tar sands, shale or coal can be processed.

The catalytic molten salt of the invention comprises zinc halide and at least one additional salt to modify the physical properties of the melt. The term zinc halide as defined above and used hereinafter includes zinc chloride, zinc bromide and zinc iodide. The modifying salt may be any of various metallic halides, but alkali metal halides are preferred since they are, in general, water soluble, relatively inexpensive and have manageable physical properties. Examples of suitable salts are the halides of lithium, sodium and potassium.

The salt mixtures consist of a major amount of zinc halide and a relatively smaller amount of the modifying salt. In general, the modifying salt should be at least about 5% by weight and less than about 60% by weight of the mixture. About 20% modifying salt is appropriate for most systems. Other salts may be added to the mixture for various reasons, such as for example, zinc oxide may be included in low concentration, i.e., not above about 2% by weight, as an acceptor for acid gases produced in the catalyzed reaction.

The addition of the modifying salt according to the invention usually reduces to some extent the catalytic activity of the zinc halide. However, in many cases reduction in activity is desirable to lessen excessive cracking to gaseous products. In any case, the improvement in process performance by the desirable changes in the physical properties and reduced solubility of hydrocarbons in the salt more than offsets any disadvantage of reduced catalytic activity.

The present process requires the use of an amount of molten salt mixture in excess of that required for stoichiometric reaction with the non-hydrocarbon elements of the hetero-atomic components in the feed, i.e., greatly in excess of that required for reaction with nitrogen, oxygen and sulfur in the feed. The invention lies in the catalytic effect of the salt and not in the stoichiometric reactions which concurrently occur. The use of a large excess of salt relative to feed characterizes this invention and is one of the distinctions of the present process over previously known processes for hydrogenation of hydrocarbonaceous material, such as coal, by impregnation of the material to be hydrogenated with a small quantity of metallic salt.

The process is carried out in the presence of hydrogen at elevated temperature and pressure and is characterized by very short reaction contact time.

Temperatures in the range of about 650–850° F. are used and preferably in the range of about 750–810° F. Hydrogen pressures of between about 50–5000 p.s.i.g. should be used—the total pressure depending upon the purity of the hydrogen used. It is an especially noteworthy characteristic of the present invention that reaction contact time is very short. In general, a contact time of between about 1.0 to 100 seconds is sufficient to obtain the desired results. Contact time is the time in which the feed and molten salt catalyst are in contact in the reaction zone. Longer contact time may, of course, be used; depending, inter alia, upon the specific nature of the feed (i.e., boiling range, heteroatomic and metallic impurities), the degree of conversion desired and the temperature and contact efficiency of the specific reactor system employed.

As in other hydroconversion processes, hydrogen is usually recovered, at least in part, from the reaction zone effluent and recycled to the reaction zone together with additional hydrogen. Pure hydrogen is not required and any suitable hydrogen-containing gas which is predominately hydrogen can be used. For example, hydrogen-rich gas containing on the order of about 70% v. or more hydrogen which is obtained from a catalytic reforming process may be used.

Various methods of contacting the hydrocarbon feed with the molten salt catalyst may be employed. One simple method comprises merely passing the hydrocarbon into a molten salt bath. Various types of reactors may be used as will readily occur to those skilled in the art. Reactors employing a dispersed liquid-in-gas system have been found suitable. Reactors employing concurrent plug flow of the fluid (molten salt, hydrogen and hydrocarbon feed) with a high degree of gas-liquid and liquid-liquid contacting are especially useful. The process may be operated continuously or batchwise, but is most efficiently and desirably conducted continuously in a short contact-time plug-flow reactor system.

The following examples serve to further illustrate the practice and advantages of the present invention, but are not intended as limiting the scope thereof.

EXAMPLE 1

The high solubility of hydrocarbons in zinc chloride makes the use of this salt as a molten catalyst undesirable since it requires rather elaborate separation procedures.

Experimental study of the solubility of pyrene in various salt mixtures led to the discovery that the addition of alkali metal halides greatly reduced the hydrocarbon solubility of the salt mixture without adversely affecting salt activity to any serious extent.

It was found that pyrene was soluble in $ZnCl_2$, only slightly soluble in a 90% $ZnCl_2$–10% LiCl mixture and insoluble in 80% $ZnCl_2$–20% KCl mixture at 700° F. The $ZnCl_2$ alone was viscous and tended to foam when mixed with pyrene and hydrogen. The $ZnCl_2$–LiCl or $ZnCl_2$–KCl mixtures were less viscous and showed no tendency to foam. ZnO added to the mixture is useful as an acceptor of HCl evolved from the reaction of organic sulfur compounds with $ZnCl_2$. As much as 2% w. ZnO was soluble in a 78% w. $ZnCl_2$, 20% w. LiCl mixture at 750° F.

Hydrocracking experiments were carried out in a tubular reactor filled with molten salt and ceramic packing to increase contacting. The salt used was 78% w. $ZnCl_2$. 20% LiCl and 2% w. ZnO. A straight-run residue together with hydrogen was passed upwards through the salt and recovered at the top of the reactor vessel. Pressure was held at 2000 p.s.i.g. and temperature, space velocity and $H_2$/oil ratio were varied.

Feed properties, operating conditions and the results of these experiments are shown in Table I.

TABLE I

| | Feed | A | B | C | D |
|---|---|---|---|---|---|
| Experimental conditions; | | | | | |
| Pressure, p.s.i.g. | | 2,000 | 2,000 | 2,000 | 2,000 |
| Temperature, ° F. | | 775 | 750 | 800 | 775 |
| WHSV (wt. liquid/wt. molten salt/hr.) | | 0.08 | 0.08 | 0.08 | 0.13 |
| $H_2$/oil (s.c.f./bbl.) | | 3,580 | 3,640 | 3,560 | 3,440 |
| Yields; | | | | | |
| $CH_4$-$C_4H_{10}$ | | 15.1 | 9.0 | 29.4 | 18.9 |
| Pentanes | | 4.9 | 1.8 | 8.8 | 6.2 |
| Hexane; | | | | | |
| 450° F. | 1.3 | 26.8 | 19.3 | 33.5 | 32.3 |
| 450° F.–615° F. | 19.2 | 23.0 | 23.0 | 18.1 | 20.3 |
| 615° F.–900° F. | 28.4 | 16.6 | 31.7 | 14.6 | 13.3 |
| 900° F.+ | 51.1 | 4.0 | 18.4 | 4.9 | 2.7 |
| Liquid properties; | | | | | |
| API gravity | 22.8 | 40.8 | 32.1 | 37.3 | 40.8 |
| Total nitrogen, p.p.m. | 1,400 | 153 | 469 | 187 | 105 |
| Sulfur, percent w. | 1.45 | 0.41 | 0.71 | 0.52 | 0.40 |

The high cracking activity of the catalyst mixture is obvious from the results. Especially noteworthy is the reduction in refractory 900° F.+ boiling range material—down to 2.7% in experiment D— and the denitrification and desulfurization ability of the molten catalyst system. It should also be pointed out that the liquid hydrocarbon product was insoluble in the salt and easily removed by phase separation.

EXAMPLE II

In another set of experiments a heavy straight run residue was contacted in a tubular reactor with hydrogen and molten salt mixtures supported on alumina at 800° F. and 2000 p.s.i.g.

Salt mixtures containing 80% w. $ZnCl_2$ and 20% w. LiCl, KCl and KI, respectively, were used. The results are shown in Table II.

TABLE II

| Salt composition | Percent w. sulfur | Specific gravity |
|---|---|---|
| (Feed) | 1.32 | 0.916 |
| 80% $ZnCl_2$/20% LiCl | 0.94 | 0.903 |
| 80% $ZnCl_2$/20% KCl | 1.05 | 0.013 |
| 80% $ZnCl_2$/20% KI | 0.73 | 0.894 |

As can be seen the salt mixtures were effective in reducing the feed sulfur content and feed gravity (indicating cracking). In all cases the salt had very low solubility for heavy hydrocarbons making phase separation of hydrocarbon and salt possible.

EXAMPLE III

Salt mixtures comprising $ZnBr_2$ and $N_3Br$ were used in experiments for converting California Straight Run Residue and heavy Flasher Pitch.

The experiments were carried out by introducing the hydrocarbon feed together with hydrogen in a tubular reactor packed with ceramic Berl saddles and filled with the molten salt. Feed was introduced at the bottom of the reactor and products were removed from the top. Due to the insolubility of the hydrocarbon in the alkali metal-containing salt mixture, hydrocarbon products were easily removed. Pertinent feed properties, salt composition, operating conditions and results are shown in Table III.

TABLE III

| | Feed | N-25 | Feed | N-26 |
|---|---|---|---|---|
| Experimental conditions: | | | | |
| Feed stock | [1] SRR | SRR | [2] FP | FP |
| Pressure, p.s.i.g | | 1,000 | | 1,500 |
| Temperature, ° F | | 750 | | 750 |
| WHSV | | 0.16 | | 0.16 |
| $H_2$/oil (mole) | | 16.4 | | 33.6 |
| Salt composition, percent W.: | | | | |
| $ZnBr_2$ | | 75 | | |
| NaBr | | 25 | | |
| Yields: | | | | |
| $CH_4$-$C_4H_8$ | | 9.1 | | 12.8 |
| Pentanes | | 3.0 | | 3.0 |
| Hexanes: | | | | |
| 450° F | 0.1 | 20.5 | | 20.7 |
| 450° F-615° F | 8.0 | 17.8 | | 11.7 |
| 615° F-900° F | 40.5 | 37.5 | 7.0 | 20.4 |
| 900° F.+ | 51.4 | 12.1 | 93.0 | 31.4 |
| Liquid properties: | | | | |
| API gravity | 13.7 | 30.8 | 9.3 | 28.4 |
| Total nitrogen, p.p.m | 10,300 | 700 | 4,100 | 136 |
| Sulfur, percent w | 1.8 | 0.4 | 2.4 | 0.9 |

[1] Straight run residue.
[2] Flasher pitch.

Comparing the properties of the feed with the properties of the product again indicates that the process of this invention results in lower boiling and cleaner materials that are more valuable than the feed.

Equivalent, although not identical results are obtained when zinc iodide is employed and when the modifying salts are the chlorides, bromides or iodides of the alkali metals. Selection of the catalyst and modifying salt will be made having regard to the character of the feed and the products desired from the process.

We claim as our invention:

1. A process for conversion of *petroleum and petroleum-like oils selected from oil from tar sands, oil from shale, oil from coal,* and heavy petroleum fractions having at least 50% boiling above about 450° F. and containing heteroatomic contaminants which comprises contacting the *oil* [fraction] with hydrogen at elevated temperature and pressure with a molten salt mixture comprising zinc halide wherein the halide is selected from the group consisting of bromide, chloride and iodide and from about 5% to about 60% w of an alkali metal chloride, bromide or iodide.

2. The process of claim 1 wherein the temperature of contacting is in the range of from about 650° F. to 850° F. and hydrogen pressure is in the range of about 500 to 5000 p.s.i.g.

3. The process of claim 2 wherein the contact time is less than about 100 seconds.

4. The process of claim 1 wherein the molten salt mixture also contains less than about 2% by weight zinc oxide.

5. The process of claim 1 wherein the petroleum fraction is a residue containing organometallic compounds and heterocyclic compounds of sulfur and nitrogen.

References Cited

The following references, cited by the Examiner, are of record in the patened file of this patent or the original patent.

UNITED STATES PATENTS

| | | | |
|---|---|---|---|
| 2,749,288 | 6/1956 | Watkins | 208—125 |
| 3,355,376 | 11/1967 | Gorin et al. | 208—10 |
| 3,371,049 | 2/1968 | Gorin et al. | 252—413 |

DELBERT E. GANTZ, Primary Examiner

G. E. SCHMITKONS, Assistant Examiner

U.S. Cl. X.R.

208—89, 208, 247, 253; 252—441